Figure 1:
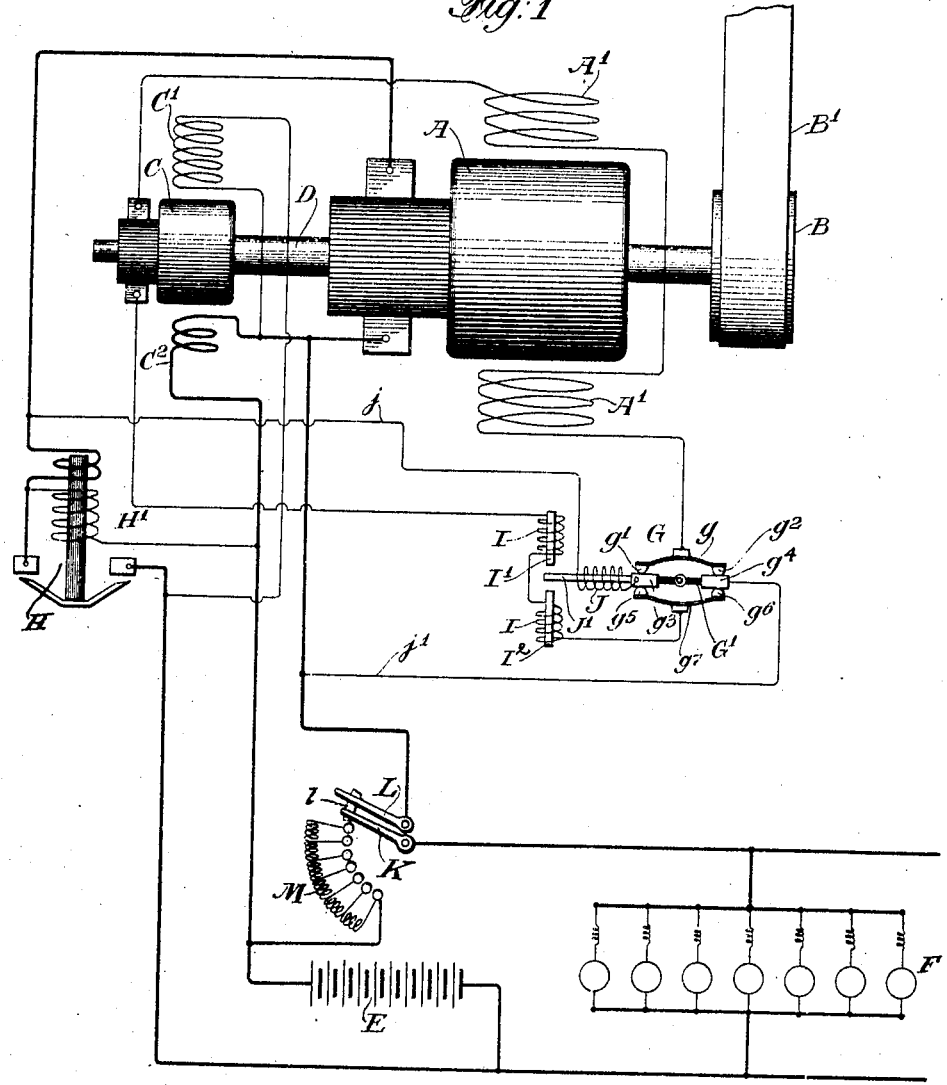

W. A. TURBAYNE.
ELECTRICAL SYSTEM OF DISTRIBUTION.
APPLICATION FILED JUNE 12, 1907.

954,599.

Patented Apr. 12, 1910.

W. A. TURBAYNE.
ELECTRICAL SYSTEM OF DISTRIBUTION.
APPLICATION FILED JUNE 12, 1907.

954,599.

Patented Apr. 12, 1910.

2 SHEETS—SHEET 2.

Witnesses:
Geo. M. Harris.
John O. Gempler.

Wm. A. Turbayne
Inventor
By his Attorneys Kenyon & Kenyon

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

954,599.  Specification of Letters Patent.  Patented Apr. 12, 1910.

Application filed June 12, 1907. Serial No. 378,516.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a sperification.

My invention relates to electrical systems of distribution and especially to means for controlling the main dynamo or dynamos of such a system. I have especially devised my means with reference to the controlling of the dynamo of an axle lighting system for cars, but the various features of my invention are not limited in their usefulness to this particular system, but I will, in the more specific description, refer more particularly to such a system.

My invention includes various features which I prefer to employ together. These features include means for so exciting the main dynamo that its polarity will be the same whatever the direction of rotation of its armature; means for rapidly building up the field strength of the main dynamo so that the dynamo can give its normal voltage at a low speed of rotation thus increasing the range of speeds within which the dynamo can be employed; means for controlling the electro-motive-force of the main dynamo regardless of changes of speed on its armature and in accordance with the needs of the system; and means for making such control tend to maintain a substantially constant battery charging current or a substantially constant total current or a current that has some intermediate value. Referring to these means more specifically, I provide an auxiliary dynamo which always rotates in the same direction as the main dynamo and is independently excited, as, for example, by having a winding connected across the battery. In the present instance the auxiliary dynamo rotates in the same direction as the main dynamo because mechanically connected therewith. I provide a circuit which connects the auxiliary dynamo to the field winding of the main dynamo so that the auxiliary dynamo may act as the exciter for the main dynamo. By this arrangement the main dynamo will always have the proper polarity regardless of its direction of rotation, so that no reversing switches need be provided between the main dynamo and the battery and work circuit. The auxiliary dynamo will have a polarity dependent upon its direction of rotation.

I provide a switch which has contacts in the exciting circuit so arranged and connected as to add the electro-motive-force of the main dynamo to that of the auxiliary dynamo. This switch is a switch controlled by coils connected in the exciting circuit and across the main dynamo, respectively, and is actuated to insert the main dynamo in its own exciting circuit and in the proper relation to that of the auxiliary dynamo by the co-action of its coils. The coils co-act to operate the switch when the electro-motive-force of the main dynamo has developed to a given extent and the direction of the movement of the switch is governed by the direction of the flow of current from the auxiliary dynamo. The electro-motive-force of the main dynamo now builds up very quickly. As soon as it reaches such a value as to enable the main dynamo to be connected across the battery and work circuit a switch in the main circuit is actuated to close the same by a coil connected across the terminals of the main dynamo. As current flows to the system it passes through a field coil of the auxiliary dynamo. The auxiliary dynamo is thus regulated by the current in this coil giving an electro-motive-force that is dependent upon the current in its coil and upon the speed of rotation. The coils are so designed that when the entire system is in operation the auxiliary dynamo is a counter electro-motive-force machine so that any reduction in its speed, which occurs simultaneously with the reduction of speed of the main dynamo, will reduce the counter-electro-motive-force it generates and therefore increase the field strength of the main dynamo. An increase of speed will produce the opposite result. The electro-motive-force of the main dynamo is therefore not materially affected by variations in the speed of the driving shaft. The current coil of the auxiliary dynamo is connected in a conductor leading to the battery but I provide a switch by which the current from the main dynamo to the work circuit may also pass through this coil or may pass around this coil, or the work circuit load may be divided at will so that any desired portion may pass through the coil and act to regulate the auxiliary dynamo, while the remainder passes directly to the work circuit without having any effect upon the regulating dynamo. In this way I can cause the main dynamo to give a substantially constant current to the system or to give a substantially constant current to the battery, while supplying the varying current demanded by the load, or the condition may be one intermediate to these two conditions.

In the drawings accompanying this specification Figure 1 is a diagrammatic representation of an axle lighting system embodying the various features of my invention. Figs. 2 to 7 are simplified diagrams illustrating the principal connections of the system at different times.

A indicates the main dynamo and A' the field winding thereof. The dynamo is indicated as being driven by a pulley B and belt B' from any suitable source of power, as, for example, the axle of a railway car.

C is an auxiliary or regulating dynamo which is in the present instance mechanically connected to the main dynamo by the shaft D and therefore rotates in the same direction as the main dynamo.

C' and C² are field windings of the auxiliary dynamo.

E is a storage battery and F a work circuit which is in the present instance indicated as a number of incandescent lamps with a regulating resistance in the circuit of each.

Figure 2:
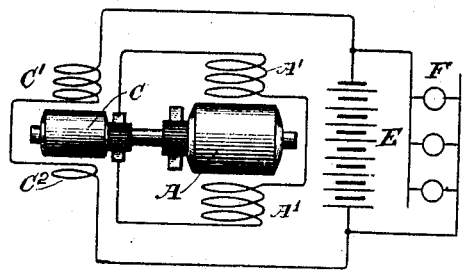

G is a switch that controls the connection of the field winding A' of the main dynamo. The system is indicated in the diagram with the various apparatus in the positions corresponding to those which they would occupy upon the starting of the system at which time the work circuit F would be supplied from the battery alone, the main circuit from the dynamo being opened by the magnetic switch H. At this time the coil C' of the auxiliary dynamo is energized being connected to the battery independently of the circuit from the main dynamo to switch H. At this time also the auxiliary dynamo C is connected in a local circuit with a field winding A' of the main dynamo, the circuit being from the upper brush of the auxiliary dynamo through the field winding A', thence through the spring $g$ to the contacts $g'$ and $g^2$ carried thereby, thence through the contacts $g^3$ and $g^4$ of the pivoted member G' of the switch to the contacts $g^5$ and $g^6$ carried on the spring $g^7$, thence through coils I to the lower brush of the auxiliary dynamo. The purpose of the coils I and the action of the switch G will be further described hereinafter. It will be seen that as the main dynamo and auxiliary dynamo begin to rotate an electro-motive-force is at once set up in the auxiliary dynamo because that dynamo is independently excited from the battery and that the direction of the current from the dynamo C will depend upon the direction of rotation. As it is necessary that the positive terminal of the main dynamo should in service always be connected to the positive terminals of the battery and work circuit, it is desirable that the main dynamo should always have the same polarity regardless of the direction of its rotation. This result is achieved by the foregoing means for exciting the main dynamo because when the direction of rotation is reversed the current from the auxiliary dynamo is reversed and therefore the field current of the main dynamo is reversed. This condition of the circuits is illustrated in Fig. 2 in which it will be seen that the only effective connections of the system are those between the auxiliary dynamo and the field of the main dynamo and between the battery and the work circuit and the battery and the field winding C' of the auxiliary dynamo.

Upon the development of an electromotive force by the main dynamo a current is developed in a local circuit which includes the conductor $j$, coil J, contact $g^3$, contacts $g'$ and $g^5$ springs $g$ and $g^7$, contacts $g^2$, $g^6$, contact $g^4$ and conductor $j'$, conductors $j$ and $j'$ being permanently connected to the t .minals of the main dynamo. The current passing through this local circuit energizes a magnetizable member J', extending from or forming part of the pivoted switch member G'. This magnetizable arm J' will be attracted upwardly or downwardly by the magnetizable members I' or I² according to the direction of the current from the auxiliary dynamo. If the arm J' moves upward then the contact arm G' will swing so that the contact is broken between $g^3$ and $g^5$ and between $g^2$ and $g^4$, whereas if the arm J' is attracted downward the contact arm G' will break contact between $g'$ and $g^3$ and between $g^4$ and $g^6$.

Figure 3:
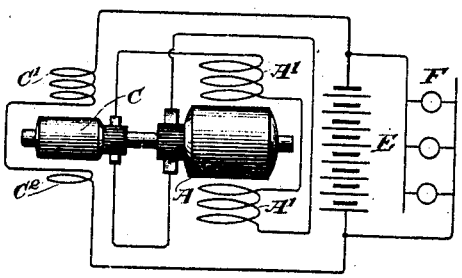
Figure 4:
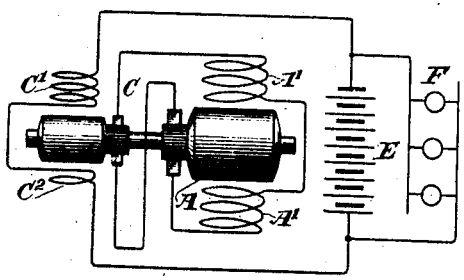

The connections established by the two positions of the switch G just described are illustrated in Figs. 3 and 4, respectively. The object of establishing this circuit is to rapidly increase the strength of the field of the main dynamo so that it can become effective at low speeds of the car upon which it is mounted. To this end it is necessary that the connections between the armatures of the main and auxiliary dynamos should be either of two opposite relations according to the direction of rotation of the dynamos and this is accomplished because the direction of movement of the switch is governed by the direction of current flowing from the auxiliary dynamo C. When the electro-motive-force of the main dynamo has built up to the normal voltage desired for the system, the switch H is closed through the action of the coil H' which is connected across the terminals of the main dynamo. This establishes a main circuit from the dynamo to the battery and work circuit through which is supplied a charging current to the battery and whatever current is needed at the work circuit. Either a part or the whole of this current may pass through the coil $C^2$ of the auxiliary dynamo, according to the position of the switch levers K, L. The field windings of the auxiliary dynamo are so designed that during normal operation the coil $C^2$ will have sufficient current to overcome the opposing magnetizing forces of the coil C' and therefore reverse the polarity of the auxiliary dynamo and cause it to become a counter machine, that is, a machine whose electro-motive-force will oppose that of the main dynamo in the exciting circuit of the latter. As the current varies in this coil the counter-electro-motive-force of the auxiliary dynamo will vary and the electro-motive-force of the main dynamo will vary, the described arrangement being such that as the current in coil $C^2$ increases the electro-motive-force of the main dynamo will decrease and vice versa, thus regulating the main dynamo to give a substantially constant current to the coil $C^2$. Whether this constant current will be the current given out by the main dynamo to the entire system, or only the charging current, or will have some intermediate relation to the total current and the charging current, will depend upon the position of the switch levers K, L, with relation to the resistance M and the switch contacts which I have provided.

I have shown the battery permanently connected with the coil $C^2$. Arm K provides a means whereby the work circuit can either be connected with the main dynamo independently of the battery and coil $C^2$, this being accomplished through the switch lever L and contact $l$ and lever K when the two levers are in the position indicated on Fig. 1, or the entire current to the work circuit may pass through the coil $C^2$, this being accomplished if the switch lever K is swung on to the resistance M, while the switch L is in the position shown; or part of the current from the main dynamo to the work circuit may pass through the coil $C^2$, whereas part will pass into the work circuit independently of the coil $C^2$, this being accomplished if the levers K and L are in such position as to include some portion of the resistance M between them. This gives a means for regulating the dynamo to meet various conditions of operation including various conditions of battery charge.

Figure 5:
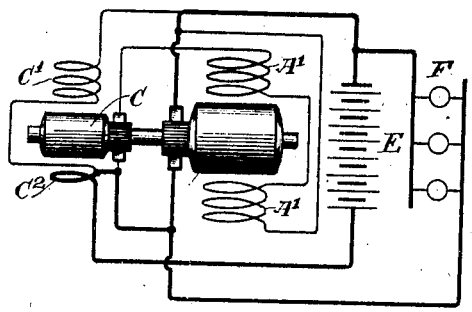
Figure 6:
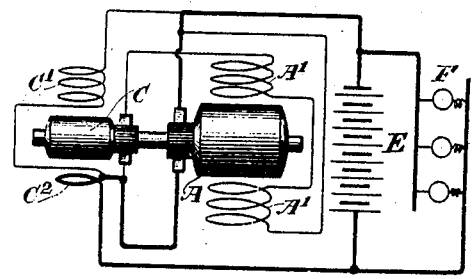
Figure 7:
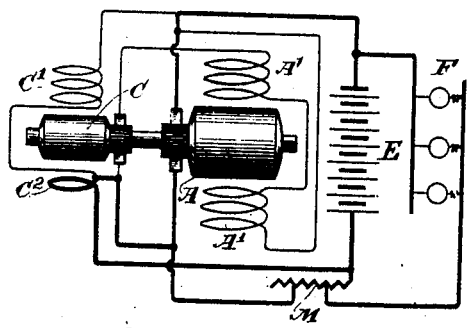

The connection whereby the current in coil $C^2$ is that of the charging current is illustrated in Fig. 5. Fig. 7 illustrates the condition when some of the current of the work circuit passes through coil $C^2$. Fig. 6 indicates the connection when the total current of battery and work circuit passes through the coil $C^2$.

While I have described in considerable detail one specific embodiment of my invention, I desire it to be understood that my invention is not limited to the precise details of structure and arrangement and connection illustrated and described since such details will necessarily be modified according to the particular local conditions to be met and according to the preferences of the engineer.

I claim:

1. Two dynamos and suitable circuits and switching mechanism arranged to connect a field winding of one dynamo in the circuit of the other dynamo or in a circuit of both dynamos in series and a battery for exciting one of said dynamos.

2. Two dynamos mechanically connected and suitable circuits and switching mechanism arranged to connect a field winding of one dynamo in the circuit of the other dynamo or in a circuit of both dynamos in series.

3. Two dynamos, suitable circuits therefor, and a switching mechanism operated responsively to a given electrical condition of one dynamo for shifting the field of that dynamo from the circuit of the other dynamo to a circuit including both dynamos in series.

4. Two dynamos mechanically connected, suitable circuits therefor, and a switching mechanism operated responsively to a given electrical condition of one dynamo for shifting the field of that dynamo from the circuit of the other dynamo to a circuit including both dynamos in series.

5. Two dynamos, suitable circuits therefor, and a switching mechanism operated at a given electro-motive force of one dynamo for shifting the field of that dynamo from the circuit of the other dynamo to a circuit including both dynamos in series.

6. A main dynamo and an auxiliary dynamo, a separate source of supply connected to a field-winding of said auxiliary dynamo, means for connecting the auxiliary dynamo to act as the exciter for the main dynamo, and dependent upon current flow from the main dynamo for connecting the two dynamos in series for exciting the main dynamo.

7. A main dynamo and an auxiliary dynamo mechanically connected, a separate source of supply connected to a field-winding of said auxiliary dynamo, means for connecting the auxiliary dynamo to act as the exciter for the main dynamo, and dependent upon current flow from the main dynamo for connecting the two dynamos in series as an exciter for the main dynamo.

8. A main dynamo and an auxiliary dynamo, mechanically connected, a separate source of supply connected to a field-winding of said auxiliary dynamo, means for exciting the main dynamo in accordance with the electro-motive force of the auxiliary dynamo, and depending upon current flow from the main dynamo, for exciting the same in accordance with the sum of the electro-motive forces of both dynamos.

9. A main dynamo and an auxiliary dynamo, mechanically connected, a separate source of supply connected to a field-winding of said regulating dynamo, a switch having contacts and connections adapted to place a field-winding of the main dynamo in a local circuit supplied by the auxiliary dynamo, or in local circuit supplied by the two dynamos in series, and means for actuating said switch responsively to a given electrical condition of the main dynamo.

10. A main dynamo and an auxiliary dynamo, means for exciting said auxiliary dynamo at starting independently of the current of either dynamo, means for exciting the main dynamo at starting from the auxiliary dynamo and after starting by the two dynamos in series.

11. A main dynamo and an auxiliary dynamo mechanically connected, means for exciting said auxiliary dynamo at starting independently of the current of either dynamo, means for exciting the main dynamo at starting from the auxiliary dynamo and after starting by the two dynamos in series.

12. A main dynamo and an auxiliary dynamo, means for exciting said auxiliary dynamo at starting independently of the current of either dynamo, means for exciting the main dynamo at starting from the auxiliary dynamo and upon a given electro-motive force of the main dynamo by the two dynamos in series.

13. Two dynamos, a switch with contacts and connections adapted to establish an exciting circuit with both dynamos in series therein and coacting coils, connected to have currents determined by the electrical condition of said dynamos, controlling the operation of said switch.

14. Two dynamos mechanically connected, a switch with contacts and connections adapted to establish an exciting circuit with both dynamos in series therein and coacting coils, connected to have currents determined by the electrical condition of said dynamos, controlling the operation of said switch.

15. Two dynamos, a reversing switch with contacts and connections adapted to establish an exciting circuit with both dynamos in series therein and coacting coils, connected to have currents determined by the electrical condition of said dynamos, actuating and determining the direction of movement of said switch.

16. Two dynamos, a reversing switch with contacts and connections adapted to establish an exciting circuit with both dynamos in series therein, coacting coils for operating said switch, said coils being connected and arranged to actuate the switch at a given electro-motive force of one dynamo and in a direction dependent upon the polarity of the other dynamo.

17. Two dynamos, a reversing switch with contacts and connections adapted to establish an exciting circuit with both dynamos in series therein, coacting coils to operate said switch, one of said coils being connected to one dynamo and determining the conditions under which said switch is to be moved, the other coil being connected to the other dynamo and determining the direction of movement of said switch.

18. A main dynamo and a constantly excited dynamo, a switch having contacts and connections adapted to place the dynamos in series in either of two opposite connections in an exciting circuit for the main dynamo, a coil connected to the constantly excited dynamo and a coacting coil connected to the main dynamo, and means for controlling the actuation and position of said switch in accordance with the coaction of said coils.

19. A main dynamo, an auxiliary dynamo, and means for causing the latter to act under different conditions of the system to produce an exciting electro-motive force for the main dynamo, an added electro-motive force to that of the main dynamo for exciting the latter and a counter electro-motive force to that of the main dynamo for exciting the latter.

20. A main dynamo, an auxiliary dynamo, and means acting under different conditions to cause excitation of said main dynamo in accordance with the electro-motive force of the auxiliary dynamo, in accordance with the sum of the electro-motive forces of the dynamos and in accordance with the difference of said electro-motive forces.

21. A main dynamo, an auxiliary dynamo, and means acting under different conditions to cause excitation of said main dynamo in accordance with the electro-motive force of the auxiliary dynamo, in accordance with the sum of the electro-motive forces of the dynamos and in accordance with the difference of said electro-motive forces, said means varying the counter electro-motive force of the auxiliary dynamo to regulate the condition of the main dynamo.

22. A main dynamo and an auxiliary dynamo mechanically connected, and means acting under different conditions to cause excitation of said main dynamo in accordance with the electro-motive force of the auxiliary dynamo, in accordance with the sum of the electro-motive forces of the dynamos and in accordance with the difference of said electro-motive forces.

23. A main dynamo and an auxiliary dynamo mechanically connected, acting under different conditions to excite said main dynamo in accordance with the electro-motive force of the auxiliary dynamo, in accordance with the sum of the electro-motive forces of the dynamos and in accordance with the difference of said electro-motive forces, said means varying the counter electro-motive force of the auxiliary dynamo to regulate the condition of the main dynamo.

24. A main dynamo and an auxiliary dynamo mechanically connected, an independent source of supply connected to a field-winding of the auxiliary dynamo, and means acting under different conditions to cause excitation of said main dynamo in accordance with the electro-motive force of the auxiliary dynamo, in accordance with the sum of the electro-motive forces of the two dynamos and in accordance with the difference of said electro-motive forces.

25. A main dynamo and an auxiliary dynamo mechanically connected, an independent source of supply connected to a field-winding of the auxiliary dynamo, and means acting under different conditions to cause excitation of said main dynamo in accordance with the electro-motive force of the auxiliary dynamo, in accordance with the sum of the electro-motive forces of the two dynamos and in accordance with the difference of said electro-motive forces, said means varying the counter electro-motive force of the auxiliary dynamo to regulate the condition of the main dynamo.

26. A main dynamo and an auxiliary dynamo, means for determining the polarity of the main dynamo by the current of the auxiliary dynamo, means, dependent upon current from the main dynamo, for exciting the main dynamo by the two dynamos acting cumulatively in series, and means, dependent upon current flow to the system, for reversing the polarity of the auxiliary dynamo.

27. A main dynamo and an auxiliary dynamo, means for determining the polarity of the main dynamo by the current of the auxiliary dynamo, means, dependent upon current from the main dynamo, for exciting the main dynamo by the two dynamos acting cumulatively in series, and means, dependent upon current flow to the system, for reversing the polarity of the auxiliary dynamo, and varying its electro-motive force.

28. A means for regulating a dynamo, embracing a second dynamo mechanically connected thereto and having an independent excitation, means for exciting the first dynamo by the second, and means for placing the two dynamos in series for exciting the first dynamo and varying the electro-motive force of the second dynamo.

29. A main dynamo and an auxiliary dynamo, a separate source of supply exciting the auxiliary dynamo, a circuit connecting the field of the main dynamo in an exciting circuit supplied by the auxiliary dynamo, a switch adapted to connect the main dynamo in series in said circuit with its brushes in either relation to those of the auxiliary dynamo, coacting coils connected with the two dynamos and arranged to determine the actuation and direction of movement of said switch, and means, dependent upon current flow from the main dynamo to the system for varying and reversing the electro-motive force of the auxiliary dynamo.

30. A main dynamo and an auxiliary dynamo mechanically connected, a separate source of supply exciting the auxiliary dynamo, a circuit connecting the field of the main dynamo in an exciting circuit supplied by the auxiliary dynamo, a switch adapted to connect the main dynamo in series in said circuit with its brushes in either relation to those of the auxiliary dynamo, coacting coils connected with the dynamos and arranged to determine the actuation and direction of movement of said switch, and means, dependent upon current flow from the main dynamo to the system for varying and reversing the electro-motive force of the auxiliary dynamo.

31. In an electrical system of distribution, a main dynamo, a battery, a work circuit, a switch controlling the circuit between the main dynamo and the battery and work-circuit, an auxiliary dynamo having a field-winding connected across the battery, a circuit including the auxiliary dynamo and the field-winding of the main dynamo, a switch adapted to insert the main dynamo in the latter circuit, and means for actuating each of said switches responsively to given electrical conditions of the main dynamo.

32. A main dynamo, a battery, a work-circuit, a regulating dynamo controlling the current in the field of the main dynamo, a coil for regulating the electro-motive force of the regulating dynamo, and means for varying the connection of said coil to make it responsive to battery charging current or to the total current of the main dynamo, said means embracing a rheostat.

33. A main dynamo, a battery, a work-circuit, a regulating dynamo controlling the current in the field of the main dynamo, a coil for regulating the electro-motive force of the regulating dynamo, and means for varying the connection of said coil to make it responsive to battery charging current or to the total current of the main dynamo or 34. A main dynamo, a battery, a work-circuit, a regulating dynamo controlling the current in the field of the main dynamo, and means for controlling the current in the regulating dynamo responsively either to charging current variations or to variations of the charging current and part of the work current.

35. A main dynamo, a battery, a work-circuit, a regulating dynamo controlling the current in the field of the main dynamo, and means for controlling the current in the regulating dynamo responsively either to charging current variations or to variations of the total current of the main dynamo or to variations of intermediate relations of the charging and work-circuit currents.

36. A main dynamo, a battery, a work-circuit, a regulating dynamo, means for exciting the main dynamo responsively to the sums of the electro-motive forces of the main and regulating dynamos, and means for reversing the polarity of the regulating dynamo at a given charging current and for varying its reversed electro-motive force as the charging current varies above said given current.

37. A main dynamo, a battery, a work-circuit, a regulating dynamo, means for exciting the main dynamo responsively to the sums of the electro-motive forces of the main and regulating dynamos, a coil arranged to vary and reverse the electro-motive force of the regulating dynamo, and means for varying the connections of said coil to make its current correspond either with that of the charging current or with that of the total current of the main dynamo.

38. A main dynamo, a battery, a work-circuit, a regulating dynamo, means for exciting the main dynamo responsively to the sums of the electro-motive forces of the main and regulating dynamos, a coil arranged to vary and reverse the electro-motive force of the regulating dynamo, and means for varying the connections of said coil to make its current correspond either with that of the charging current or with that of the total current of the main dynamo or to intermediate relations of the charging and work-circuit currents.

39. A main dynamo, a work-circuit, a battery, a regulating dynamo, differential coils controlling the electro-motive force of the regulating dynamo, one being connected to the battery, the other connected in series with the battery and main dynamo, a circuit connecting the regulating dynamo as an exciter for the main dynamo, means governed responsively to a given electrical condition of the main dynamo and in accordance with the polarity of the regulating dynamo for adding the electro-motive force of the main dynamo to the said exciting circuit, and means governed responsively to a given electrical condition of the main dynamo for closing the main circuit.

40. A main dynamo, a work-circuit, a battery, a regulating dynamo, differential coils controlling the electro-motive force of the regulating dynamo, one being connected to the battery, means for connecting the other coil either in series with the battery or in series with the total load of the main dynamo, a circuit connecting the regulating dynamo as an exciter for the main dynamo, means governed responsively to a given electrical condition of the main dynamo and in accordance with the polarity of the regulating dynamo for adding the electro-motive force of the main dynamo to the said exciting circuit, and means governed responsively to a given electrical condition of the main dynamo for closing the main circuit.

41. A main dynamo, a work-circuit, a battery, a regulating dynamo, differential coils controlling the electro-motive force of the regulating dynamo, one being connected to the battery, means for connecting the other coil either in series with the battery or in series with the total load of the main dynamo, or in a circuit having a current intermediate to that of the charging current and that of said total load, a circuit connecting the regulating dynamo as an exciter for the main dynamo, means governed responsively to a given electrical condition of the main dynamo and in accordance with the polarity of the regulating dynamo for adding the electro-motive force of the main dynamo to the said exciting circuit, and means governed responsively to a given electrical condition of the main dynamo for closing the main circuit.

42. The combination of a main dynamo driven at variable speed, an auxiliary dynamo and means for causing the auxiliary dynamo to aid in exciting the main dynamo while it is building up its field and to cause the auxiliary dynamo to act to cut down the field strength of the main dynamo as its output tends to increase above certain desired limits.

43. The combination of a dynamo driven at a variable speed, an auxiliary source of electromotive force and means for causing said auxiliary source of electromotive force to aid in building up the field of the dynamo and to cause the auxiliary source of electromotive force to cut down the field strength of the dynamo as its output tends to increase above certain desired limits.

44. The combination of a dynamo, driven in different directions, an auxiliary source of electromotive force, means for causing the auxiliary source of electromotive force to excite said dynamo in a certain direction in accordance with its direction of rotation so that the dynamo will produce an electromotive force at its brushes always in the same direction irrespective of its direction of rotation, and means for causing said auxiliary electromotive force to act to cut down the excitation of the dynamo as its output tends to increase above certain desired limits.

In testimony whereof, I have signed my name to this specification, in the presence of two subscribing witnesses.

WILLIAM A. TURBAYNE.

Witnesses:
CLIFTON C. EASTERBROOKS,
A. B. BRIMMER.